F. F. FORSHEE.
TERMINAL STRUCTURE FOR ELECTRIC RANGES.
APPLICATION FILED MAR. 1, 1920.
1,385,989.
Patented Aug. 2, 1921.
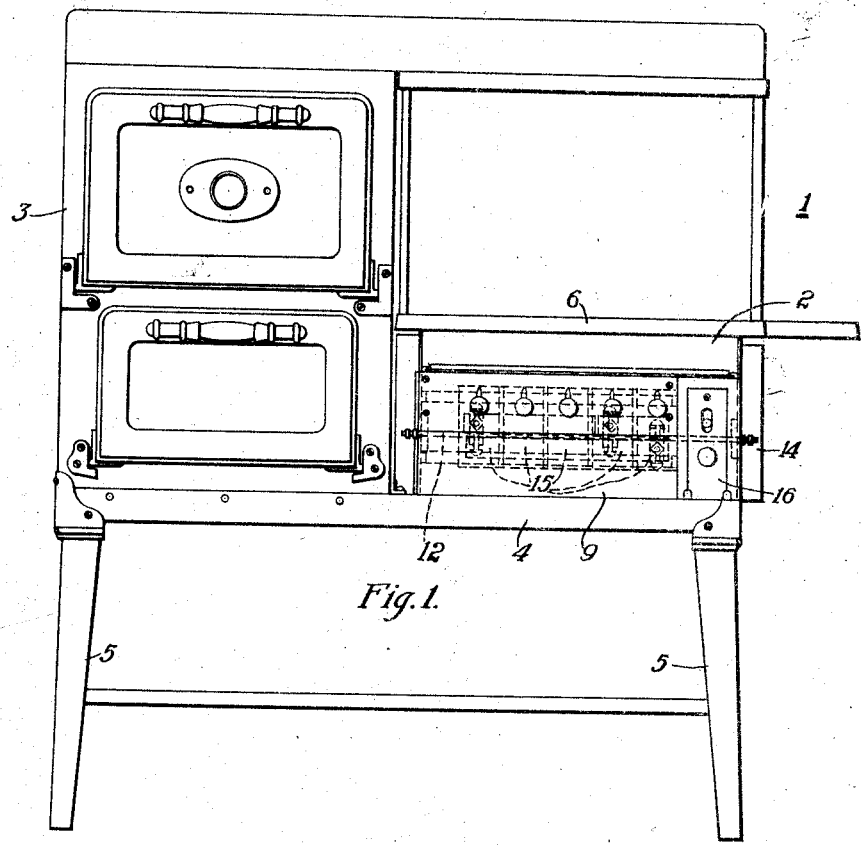
Fig. 1.
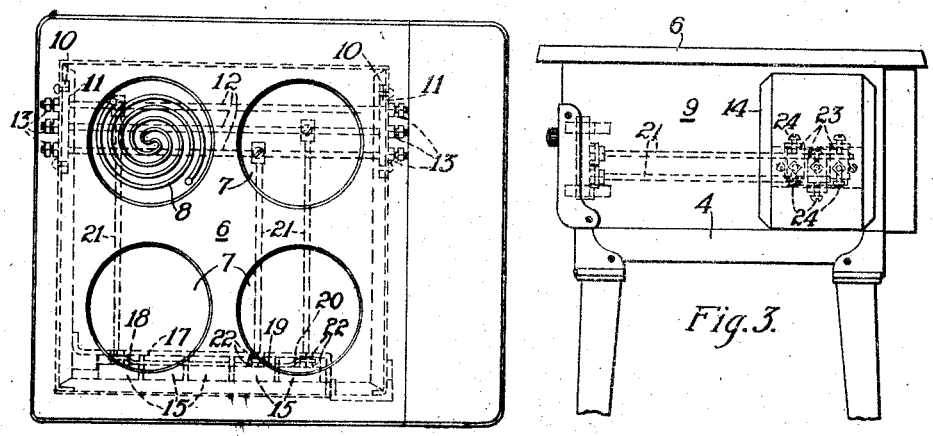
Fig. 2.
Fig. 3.
WITNESSES:
H. T. Shelhamer
H. M. Biebel
INVENTOR
Frank F. Forshee
BY
Chesley G. Carr
ATTORNEY

UNITED STATES PATENT OFFICE.

FRANK F. FORSHEE, OF FLINT, MICHIGAN, ASSIGNOR TO WESTINGHOUSE ELECTRIC PRODUCTS COMPANY, A CORPORATION OF MICHIGAN.

TERMINAL STRUCTURE FOR ELECTRIC RANGES.

1,385,989.  Specification of Letters Patent.  Patented Aug. 2, 1921.

Application filed March 1, 1920. Serial No. 362,424.

*To all whom it may concern:*

Be it known that I, FRANK F. FORSHEE, a citizen of the United States, and a resident of Flint, in the county of Genesee and State of Michigan, have invented a new and useful Improvement in Terminal Structures for Electric Ranges, of which the following is a specification.

My invention relates to electrically-heated apparatus and particularly to electric ranges, and it has for one of its objects to provide a simple and novel bus-bar structure to which the electric supply conductors may be operatively connected.

A further object is to provide conducting means for electrically connecting the bus bars to the switches controlling the supply of electrical energy to the various electric heating elements of the range, which switches are located at the front of the stove and immediately below the level of the dirt tray.

In practising my invention, I provide a plurality of bare bus bars mounted in insulating supporting means and located at the rear of the heater box beneath the stove top. I mount the switches and the electromagnetic switch which control the supply of energy to the various heating elements at the front of the heater box and provide simple conducting means for electrically connecting the control switches to the bus bars.

In the single sheet of drawings, Figure 1 is a front view of an electric range in which is incorporated the device embodying my invention; Fig. 2 is a top plan view of a stove, with the device embodying my invention shown in its operative position, and Fig. 3 is a view, in side elevation, of the same device.

An electric range 1 comprises a stove 2 and a two-door oven 3, both the stove and the oven being mounted on a shelf or platform 4 which is, in turn, mounted on suitable supporting members 5.

The stove comprises a top 6 which is provided with a plurality of openings 7 in which are located suitable heating elements 8 (only one of which is shown), and a heater box 9 which supports the stove top 6 and is, in turn, mounted on the platform 4.

Plates 10 of insulating material are suitably secured to the sides of the heater box 9 adjacent to, and covering, openings 11 therein at the rear of the heater box. A plurality of metal bus bars 12 are mounted in these plates 10, each bus bar being provided with a plurality of nuts 13 at each end. The inner nut, at each end of a bar 12, may be used to hold the bar in its proper position in the members 10 and the outer nut may be used to clamp the end of an electric supply conductor (not shown) against the inner nut. This construction permits of connecting the supply conductors either at the outer side of the range or at the central portion, as may be convenient or desired. In order to prevent the operator from accidentally touching the bare live bus bars, a protecting cover member 14 of channel section is secured to the side of the heater box.

At the front of the heater box 9 are placed a plurality of control switches 15 and an electromagnetically-actuated circuit breaker 16. The base of each of the switches 15 is substantially rectangular in outline, as may best be seen by reference to Fig. 1. A member 17 of substantially Z-form serves to hold the switches 15 against the front side of the heater box 9. Each one of the heaters 8 in the stove is controlled by one of the switches 15, and a heating element in the oven (not shown) is controlled by means of one of the switches 15 and the circuit breaker 16.

One terminal of all or of part of the switches 15 may be operatively connected to a metal strap member 18 while the same terminal of the oven-control switch is connected to a relatively short strap member 19. The other terminal of all of the switches 15 may be connected to a similar strap member 20.

If the supply circuit (not shown) is a two-wire circuit, the middle one of the rods 12 may be connected to one supply-circuit conductor and the two outer rods 12 may be connected, in parallel, to the other supply-circuit conductor. In case the supply circuit is a three-wire circuit, the middle rod may be connected to the neutral wire of the supply circuit, and the outer rods may be connected to the positive and to the negative conductors, respectively.

Connection between the strap members 18, 19 and 20 and the main bus bars 12 is made by means of rods 21 which are threaded at one end to receive a plurality of nuts 22 to permit of clamping one of the strap members 18, 19 or 20 therebetween. A clamping member 23, substantially rectangular in outline, is provided with two openings at right angles to each other, adapting it to be slidably mounted on one of the rods 12 and to receive one of the rods or bars 21. Screws 24 are provided in each of the members 23 to permit of clamping the rods 21 and 12 in the respective openings, thus maintaining the proper operative positions and also affording good electrical connection therebetween.

I thus provide a relatively open system of electrical connections between the supply conductors and the control switches, which may be easily inspected and which, by reason of its construction, is not easily short-circuited. The connections to the supply-circuit conductors may also be easily and quickly made and changed if desired. A further advantage of my construction is that relatively heavy connecting members without insulation may be used which may be located in a well-ventilated position in the heater box, thus insuri relatively low temperature during operation. When insulated conductors are used to electrically connect the various elements, the insulation on the conductors may be charred or destroyed by the heat to which the conductors are subjected, with the resultant possibility of short-circuits or grounds, all of which may be avoided by the use of the device embodying my invention.

Various modifications may be made in the device without departing from the spirit and scope of my invention, and I desire that only such limitations shall be placed thereon as are imposed by the prior art or are specifically set forth in the appended claims.

I claim as my invention:

1. In an electric stove, the combination with a plurality of electric heating elements, a member of box-shape for supporting said elements, and switches for controlling said heating elements, of a plurality of bus bars located in said member of box-shape, insulating supporting means for supporting said bus bars adjacent their ends only and means supported at each end only for electrically connecting said bus bars to said switches.

2. In an electric stove, the combination with a stove top, a plurality of electric heating elements located in said stove top, a member of box-shape for supporting said top, and switches mounted in the front of said member of box-shape, of a plurality of bus bars located in the rear part of said member of box-shape, insulating supporting means for supporting said bus bars adjacent their ends only, located in openings in the sides of said member of box shape, and means for electrically connecting said bus bars to said switches.

3. In an electric stove, the combination with a stove top, a plurality of electric heating elements located in said stove top, a member of box-shape for supporting said stove top and switches mounted in the front part of said member of box-shape, of a plurality of main supply bus bars located in the rear part of said member of box-shape, insulating supporting means for said main bus bars mounted in the sides of said member of box-shape, secondary bus bars operatively connected to, and supported by, said switches, and inherently non-sagging conducting means electrically connecting said main and said secondary bus bars and being supported thereby.

4. In an electric stove, the combination with a plurality of electric heating elements, controlling means for said heating elements, and supporting means for said heating elements and said controlling means, of insulating means located in said supporting means, main supply bus bars held by said insulating means, means at each end of said main supply bus bars adapted to position said bus bars in said insulating means and to operatively engage supply circuit conductors, and means supported by, and operatively connecting, said main supply bus bars and said controlling means.

5. In an electric stove, the combination with a plurality of electric heating elements, switches for said heating elements, and supporting means for said heating elements and said switches, of a plurality of bare bus bars, insulating means mounted in said supporting means and supporting said bus bars adjacent their ends, secondary bus bars supported by, and operatively connected to, said switches, and rods electrically connecting said bare bus bars and said secondary bus bars, each of said rods being supported at one end by one of said secondary bus bars and at the other end by one of said bare bus bars intermediate its ends.

In testimony whereof I have hereunto subscribed my name this 25th day of Feb. 1920.

FRANK F. FORSHEE.